(12) United States Patent
Kadowaki

(10) Patent No.: US 11,946,520 B2
(45) Date of Patent: Apr. 2, 2024

(54) VIBRATION-DAMPING DEVICE

(71) Applicant: YAMASHITA RUBBER CO., LTD., Fujimino (JP)

(72) Inventor: Hirokazu Kadowaki, Saitama (JP)

(73) Assignee: YAMASHITA RUBBER CO., LTD., Fujimino (JP)

( * ) Notice: Subject to any disclaimer, the term of this patent is extended or adjusted under 35 U.S.C. 154(b) by 0 days.

(21) Appl. No.: 17/694,386

(22) Filed: Mar. 14, 2022

(65) Prior Publication Data
US 2022/0307570 A1 Sep. 29, 2022

(30) Foreign Application Priority Data
Mar. 23, 2021 (JP) .................. 2021-049158

(51) Int. Cl.
*F16F 15/04* (2006.01)
*F16F 15/00* (2006.01)

(52) U.S. Cl.
CPC .................. *F16F 15/04* (2013.01)

(58) Field of Classification Search
CPC ..... F16F 2230/36; F16F 1/3828; F16F 1/3835
See application file for complete search history.

(56) References Cited

U.S. PATENT DOCUMENTS

| | | | | |
|---|---|---|---|---|
| 3,933,367 A | * | 1/1976 | Tamas | B60G 5/047 |
| | | | | 267/269 |
| 8,684,341 B2 | * | 4/2014 | Nishimae | F16F 7/08 |
| | | | | 267/141 |
| 9,709,116 B2 | * | 7/2017 | Shimada | F16F 1/38 |
| 2008/0284076 A1 | * | 11/2008 | Miyahara | F16F 1/387 |
| | | | | 267/140.13 |
| 2018/0328433 A1 | * | 11/2018 | Nishi | B60K 5/1291 |

FOREIGN PATENT DOCUMENTS

| | | | | |
|---|---|---|---|---|
| GB | 2235664 A | * | 3/1991 | ........... B60K 5/1216 |
| JP | 2011-226532 | | 11/2011 | |
| WO | WO-2013140700 A1 | * | 9/2013 | ............... F16F 1/38 |
| WO | WO-2018198413 A1 | * | 11/2018 | ............... B60K 5/12 |

* cited by examiner

*Primary Examiner* — Melody M Burch
(74) *Attorney, Agent, or Firm* — Rankin, Hill & Clark LLP

(57) ABSTRACT

A vibration-damping device includes a housing having a cylindrical mounting hole therein and a vibration-damping member provided in the mounting hole. The vibration-damping member includes an outer cylinder fitted into the mounting hole, an inner cylinder provided in the outer cylinder, and a rubber elastic body inserted between the outer cylinder and the inner cylinder. The rubber elastic body is formed with a bore penetrating in an axial direction thereof and a stopper protruding from a radially-inner wall surface thereof for the bore. The housing is formed with a receiving part which faces the stopper, in a radial direction of the mounting hole, across a gap.

4 Claims, 5 Drawing Sheets

VIBRATION-DAMPING DEVICE

CROSS-REFERENCE TO RELATED APPLICATION

The present application claims the benefit of priority to Japanese Patent Application No. 2021-049158 filed on Mar. 23, 2021, the disclosures of all of which are hereby incorporated by reference in their entireties.

TECHNICAL FIELD

The present disclosure relates to a vibration-damping device.

BACKGROUND

A vibration-damping device used in a vehicle such as an automobile is inserted between a vibrating member, such as a suspension or an engine, and a support member such as a body frame, to absorb vibrations of the vibrating member.

Such a vibration-damping device has an outer cylinder, an inner cylinder arranged in the outer cylinder, and a rubber elastic body inserted between the outer cylinder and the inner cylinder.

In one of the vibration-damping devices described above, the rubber elastic body has bores axially penetrating therethrough, to have stoppers arranged on radially-inner wall surfaces thereof for the bores and receiving parts arranged on radially-outer wall surfaces thereof for the bores, to face with each other (refer to Japanese Patent Application Publication No. 2011-226532, for example).

In the configuration, when vibrations are inputted to the inner cylinder and the rubber elastic body is displaced, the stopper comes in contact with the receiving part to regulate the displacement of the rubber elastic body.

To adjust the vibration-damping device described above so as to have desired vibration damping characteristics, reducing a gap (so as to be about 1 mm, for example) between the stopper and the receiving part, that is, reducing an allowable displacement amount of the rubber elastic body may be required in some cases. However, it is difficult to define a small gap using a mold. There is a method of reducing the gap between the stopper and receiving part by making a diameter of the outer cylinder small after the vibration-damping device has been molded using the mold. The method increases processes for manufacturing, to have a problem of increasing manufacturing costs of the vibration-damping device.

The present disclosure is intended to provide a vibration-damping device which solves the aforementioned problem, to reduce an allowable displacement amount of a rubber elastic body while preventing manufacturing costs from increasing, and to facilitate adjusting vibration damping characteristics.

SUMMARY

To solve the above-mentioned problem, the present disclosure provides a vibration-damping device including a housing having a cylindrical mounting hole therein and a vibration-damping member provided in the mounting hole. The vibration-damping member includes an outer cylinder fitted into the mounting hole, an inner cylinder provided in the outer cylinder, and a rubber elastic body inserted between the outer cylinder and the inner cylinder to elastically join the outer cylinder with the inner cylinder. The rubber elastic body is formed with a bore penetrating in an axial direction thereof and a stopper protruding from a radially-inner wall surface thereof for the bore. The housing is formed with a receiving part which faces the stopper, in a radial direction of the mounting hole, across a gap.

In the vibration-damping device of the present disclosure, only the stopper of the stopper and receiving part is formed in the rubber elastic body. Therefore, when the vibration-damping device is molded using a mold, the size of a gap between the stopper and receiving part is not restricted by the mold. Accordingly, in the vibration-damping device of the present disclosure, the vibration-damping member can be molded using a mold such that the gap between the stopper and the receiving part is small, to allow for precisely adjusting vibration-damping characteristics as required while preventing manufacturing costs from increasing.

In the vibration-damping device described above, when a communication part, communicating with the bore, is formed in a circumferential wall of the outer cylinder, and the receiving part is formed to protrude from an inner circumferential surface of the mounting hole so as to be inserted into the communication part, the receiving part can be formed in a simple shape.

Further, when the communication part is formed from one edge to the other edge in an axial direction of the circumferential wall, the stopper and receiving part can be elongated in the axial direction.

In the vibration-damping device described above, when the mounting hole is formed with a bottom, and the receiving part is formed to protrude from the bottom toward the rubber elastic body, so as to be inserted into the bore, there is no need to form an opening in the circumferential wall of the outer cylinder.

In the vibration-damping device described above, it is preferable that the rubber elastic body be formed with a plurality of the stoppers, and the housing be formed with the receiving part facing at least one of the stoppers.

With this configuration, the vibration-damping characteristics of the vibration-damping device can be precisely set by adjusting the number and positions of the stopper and receiving part, depending on a direction of vibration inputted to the vibration-damping device.

In the vibration-damping device, by forming only the stopper of the stopper and receiving parts in the rubber elastic body, the vibration-damping part can be molded using a mold such that the gap between the stopper and receiving parts is small. This allows for precisely adjusting the vibration damping characteristics as required while preventing manufacturing costs from increasing.

DETAILED DESCRIPTION

A description is given of embodiments of the present disclosure in detail with reference to the drawings as appropriate.

Note that, in the description for each embodiment, the same member is denoted by the same sign, and duplicate descriptions are omitted.

In the following description, an up-down direction, a front-rear direction, and a right-left direction are set for convenience in describing a vibration-damping device of each embodiment, and are not intended to limit a configuration or usage of the vibration-damping device of the present disclosure.

First Embodiment

Figure 1:
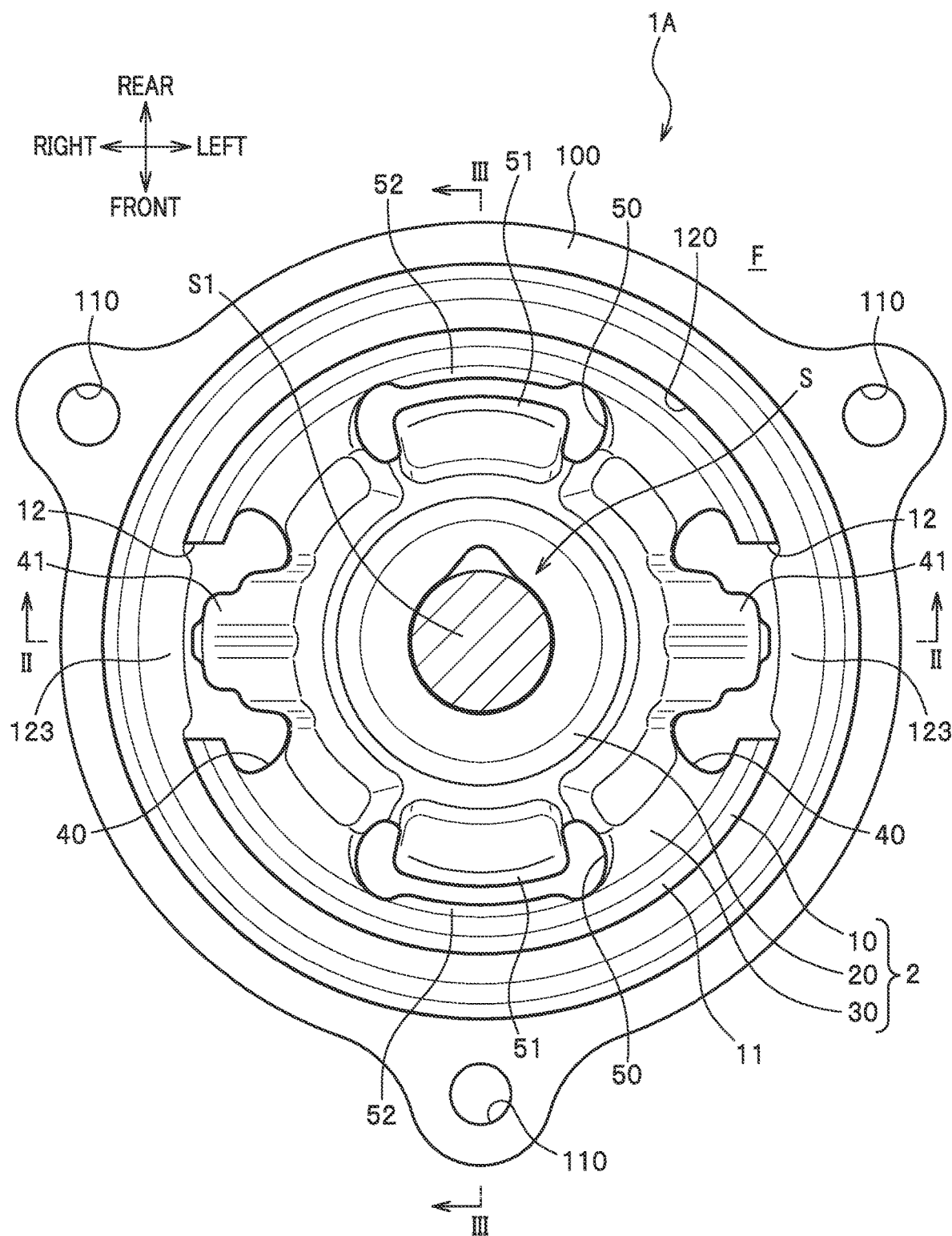
FIG. 1 is a plan view of a vibration-damping device according to a first embodiment of the present disclosure.

As shown in FIG. 1, a vibration-damping device 1A of the first embodiment is a damper mount which is inserted between a suspension S of a vehicle such as an automobile and a vehicle body frame F of the vehicle. The suspension S is a vibrating member which generates vibrations, and the vehicle body frame F is a support member which supports the suspension S.

The vibration-damping device 1A includes a housing 100 having a bottomed mounting hole 120 in a cylindrical shape and a vibration-damping member 2 arranged in the mounting hole 120.

Figure 2:
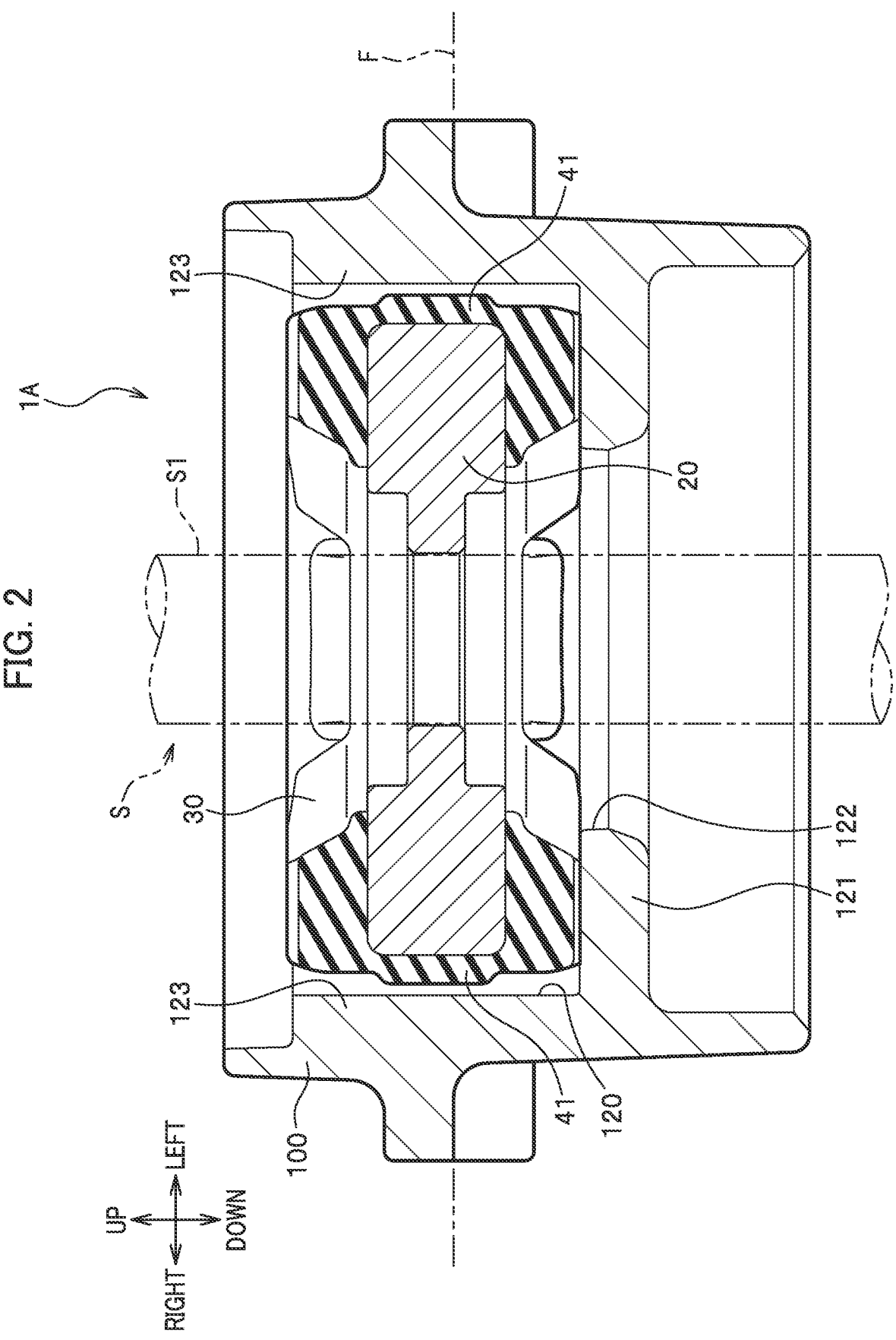
FIG. 2 is a cross-sectional view, taken along a line II-II in FIG. 1, of the vibration-damping device according to the first embodiment of the present disclosure.

The housing 100 is a metal member attached to the vehicle body frame F. The housing 100A has the cylindrical mounting hole 120 in the center thereof. As shown in FIG. 2, the mounting hole 120 has an open upper surface and a bottom 121 at a lower part thereof. The bottom 121 has a circular opening 122 in the center thereof to penetrate therethrough.

In the housing 100, a plurality of fastening parts 110 are formed around the mounting hole 120. The fastening parts 110 of the first embodiment are holes penetrating through the housing 100 in the up-down direction. Bolts inserted through the fastening parts 110 are screwed into threaded holes of the vehicle body frame F so that the housing 100 is fixed to the vehicle body frame F.

As shown in FIG. 1, the mounting hole 120 has a pair of right and left first receiving parts 123 in the inner circumferential surface therein. The first receiving parts 123 protrude inward from the inner circumferential surface of the mounting hole 120. As shown in FIG. 2, the first receiving parts 123 extend linearly along the axial direction of the mounting hole 120 from the upper surface of the bottom 121 to the upper edge of the mounting hole 120.

As shown in FIG. 1, the vibration-damping member 2 includes an outer cylinder 10 fitted in the mounting hole 120, an inner cylinder 20 arranged in the outer cylinder 10, and a rubber elastic body 30 inserted between the outer cylinder 10 and the inner cylinder 20.

The right and left first receiving parts 123 are arranged in the circumferential direction of the mounting hole 120 at intervals of 180 degrees. The right and left first receiving parts 123 are formed symmetrically about the center of the mounting hole 120.

Figure 3:
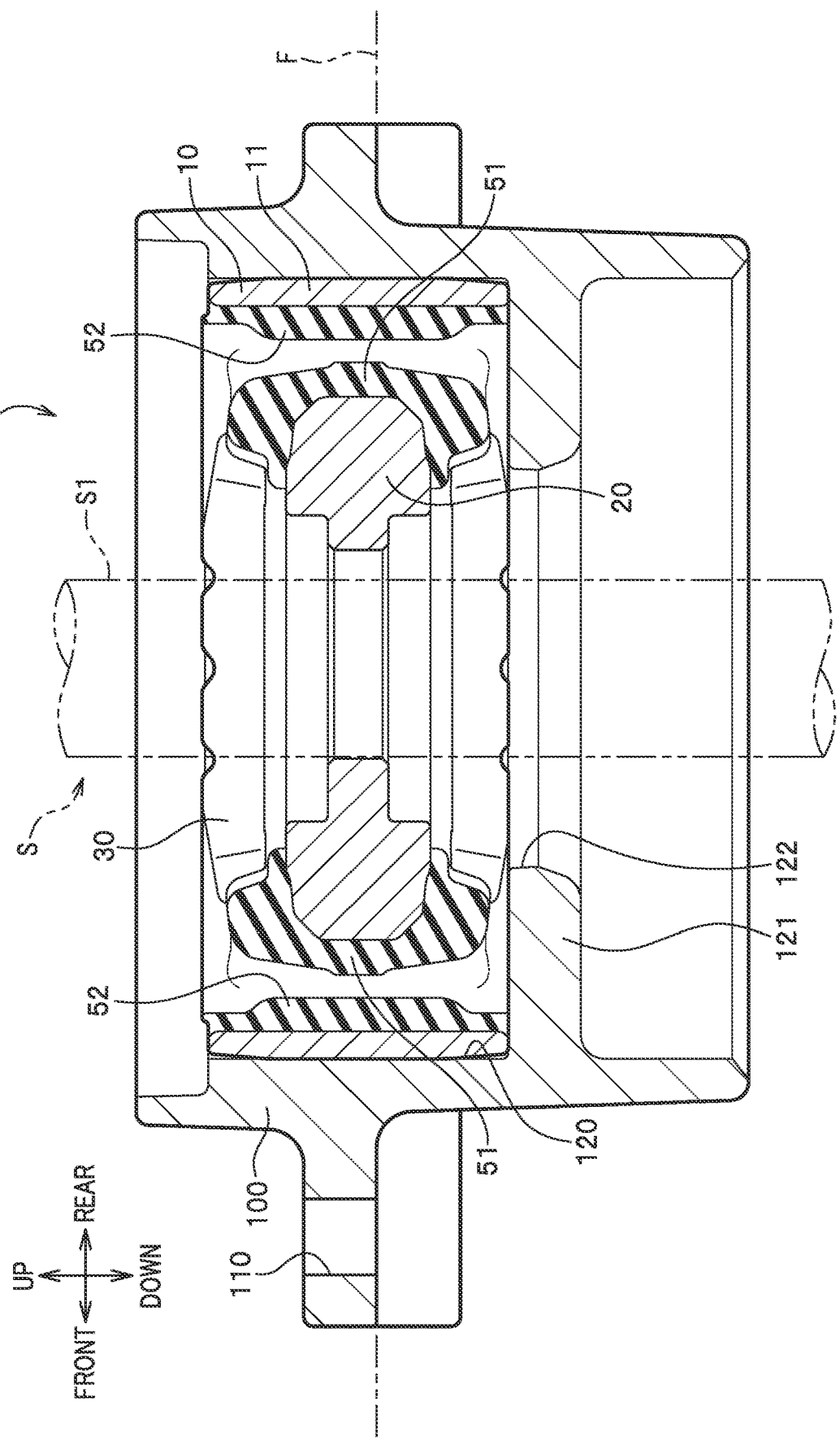
FIG. 3 is a cross-sectional view, taken along a line in FIG. 1, of the vibration-damping device according to the first embodiment of the present disclosure.

The outer cylinder 10 is a metal or resin cylindrical member. As shown in FIG. 3, the outer cylinder 10 is fitted into the mounting hole 120 of the housing 100. The outer circumferential surface of the outer cylinder 10 is pressed against the inner circumferential surface of the mounting hole 120. Further, the lower edge of the outer cylinder 10 is in contact with the upper surface of the bottom 121 in the mounting hole 120.

As shown in FIG. 1, a circumferential wall 11 of the outer cylinder 10 has a pair of right and left communication parts 12. The inside and outside of the outer cylinder 10 communicate with each other through the communication parts 12.

The communication parts 12 extend linearly along the axial direction of the outer cylinder 10 from the upper edge to the lower edge of the circumferential wall 11. The right and left communication parts 12 are formed in the circumferential wall 11 at intervals of 180 degrees. The outer cylinder 10 of the first embodiment is divided into front and rear halves by the right and left communication parts 12. That is, the outer cylinder 10 includes a pair of halved cylindrical members facing each other, having the communication parts 12 therebetween.

The width of the communication part 12 in the circumferential direction of the circumferential wall 11 is formed larger than that of the first receiving part 123 in the mounting hole 120. The right and left first receiving parts 123 are inserted into the right and left communication parts 12, respectively.

The inner cylinder 20 is a metal or resin cylindrical member. The inner cylinder 20 is arranged in the center of the outer cylinder 10. As shown in FIG. 2, a piston rod S1 of a damper of the suspension S is inserted into the inner cylinder 20. The piston rod S1 is press-fitted into the inner cylinder 20.

As shown in FIG. 1, the rubber elastic body 30 is a cylindrical member made of rubber, which is inserted between the outer circumferential surface of the inner cylinder 20 and the inner circumferential surface of the outer cylinder 10, to elastically join the outer cylinder 10 with the inner cylinder 20.

The inner circumference of the rubber elastic body 30 is vulcanization-bonded to the outer circumference of the inner cylinder 20, and the outer circumference of the rubber elastic body 30 is vulcanization-bonded to the inner circumference of the outer cylinder 10.

The rubber elastic body 30 has a pair of right and left first bores 40 penetrating therethrough in the axial direction, and a pair of front and rear second bores 50 penetrating therethrough in the axial direction.

The right and left first bores 40 are formed in the circumferential direction of the rubber elastic body 30 at intervals of 180 degrees. The front and rear second bores 50 are formed in the circumferential direction of the rubber elastic body 30 at intervals of 180 degrees. The first bore 40 and second bore 50 are formed in the circumferential direction of the rubber elastic body 30 at an interval of 90 degrees.

The first bores 40 are open on the outer circumferential surface of the rubber elastic body 30. That is, the first bores 40 are recesses formed in the outer circumference of the rubber elastic body 30. The first bores 40 communicate with the communication parts 12 of the outer cylinder 10.

First stoppers 41 are formed in the radially-inner wall surfaces of the first bores 40. The first stoppers 41 protrude outward from the radially-inner wall surfaces for the first bores 40. As shown in FIG. 2, the first stoppers 41 extend in the up-down direction.

As shown in FIG. 1, the outermost surfaces of the first stoppers 41 of the rubber elastic body 30 face the innermost surfaces of the first receiving parts 123 in the mounting hole 120, in the radial direction of the mounting hole 120, across gaps.

In the vibration-damping device 1A, when vibrations are inputted to the inner cylinder 20 and the rubber elastic body 30 is displaced, the first stoppers 41 of the rubber elastic body 30 come in contact with the first receiving parts 123 in the mounting hole 120, to restrict the displacement in the right-left direction of the rubber elastic body 30.

The second bores 50 are holes axially penetrating the rubber elastic body 30.

Second receiving parts 52 are formed in the radially-outer wall surfaces of the second bores 50. The second receiving parts 52 protrude inward from the radially-outer wall surfaces of the second bores 50. As shown in FIG. 3, the second receiving parts 52 extend in the up-down direction.

As shown in FIG. 1, second stoppers 51 are formed in the radially-inner wall surfaces of the second bores 50. The second stoppers 51 protrude outward from the radially-inner wall surfaces of the second bores 50. As shown in FIG. 3, the second stoppers 51 extend in the up-down direction.

As shown in FIG. 1, the outermost surfaces of the second stoppers 51 face the innermost surfaces of the second receiving parts 52, in the radial direction of the mounting hole 120, across gaps.

In the vibration-damping device 1A, when vibrations are inputted to the inner cylinder 20 and the rubber elastic body 30 is displaced, the second stoppers 51 of the rubber elastic body 30 come in contact with the second receiving parts 52, to restrict the displacement in the front-rear direction of the rubber elastic body 30.

Note that, when the vibration-damping device 1A described above is manufactured, the outer cylinder 10 and inner cylinder 20 are placed in a mold, and rubber material is filled in the mold to form the vibration-damping member 2. Then, the vibration-damping member 2 is inserted into the mounting hole 120 of the housing 100 to complete manufacturing the vibration-damping device 1A.

As shown in FIG. 1, in the vibration-damping device 1A of the first embodiment as described above, only the first stoppers 41 of the first stoppers 41 and the first receiving parts 123, arranged at right and left portions of the rubber elastic body 30, are formed in the rubber elastic body 30. The first receiving parts 123 are formed in the mounting hole 120 of the housing 100.

With the configuration, a size of a gap between the first stopper 41 and the first receiving part 123 is not restricted by a mold when the vibration-damping member 2 is molded using the mold.

Accordingly, in the vibration-damping device 1A of the first embodiment, the vibration-damping member 2 can be molded using a mold such that the gap between the first stopper 41 and the first receiving part 12 is small, to allow for precisely adjusting vibration-damping characteristics as required while preventing manufacturing costs from increasing.

Further, in the vibration-damping device 1A of the first embodiment, the first receiving parts 123 protrude from the inner circumferential surface of the mounting hole 120, to be formed in a simple shape, so that the mounting hole 120 is easily formed.

Still further, in the vibration-damping device 1A of the first embodiment, the communication parts 12 of the outer cylinder 10 are formed from the upper edge to the lower edge of the circumferential wall 11, to allow for elongating the first stoppers 41 and the first receiving parts 123 in the axial direction.

The first embodiment of the present disclosure has been described above, but the present disclosure is not limited thereto and can be modified as appropriate without departing from the gist thereof.

As shown in FIG. 1, in the vibration-damping device 1A of the first embodiment, the first stoppers 41 and first receiving parts 123 are arranged right and left, and the second stoppers 51 and second receiving parts 52 are arranged at the front and rear. However, in the vibration-damping device of the present disclosure, the number and arrangement of the stoppers and receiving parts are not limited thereto and are adjusted as appropriate in accordance with the required vibration-damping characteristics.

Further, in the vibration-damping device 1A of the first embodiment, only the stoppers of the stoppers and receiving parts arranged at the front and rear may be formed in the rubber elastic body 30, and the receiving parts may be formed in the mounting hole 120, as with the first stoppers 41 and first receiving parts 123.

Still further, in the vibration-damping device 1A of the first embodiment, the communication parts 12 of the outer cylinder 10 are formed from the upper edge to the lower edge of the circumferential wall 11, but the shape thereof is not limited. For example, communication parts in a recessed shape may be formed to have the outer cylinder 10 recessed in the axial direction from the upper edge or lower edge of the outer cylinder 10. Also, communication parts may be formed in a hole shape penetrating the circumferential wall 11 of the outer cylinder 10.

The vibration-damping device 1A of the first embodiment is a damper mount which is arranged between the suspension S of a vehicle and the vehicle body frame F of the vehicle such as an automobile. However, an object for vibration damping, to which the vibration-damping device of the present disclosure is applied, is not limited. For example, an object for vibration damping may be a prime mover such as an engine and a motor, an inverter, or a battery, in addition to the vehicle body.

Second Embodiment

Next, a description is given of a vibration-damping device 1B according to a second embodiment.

Figure 4:
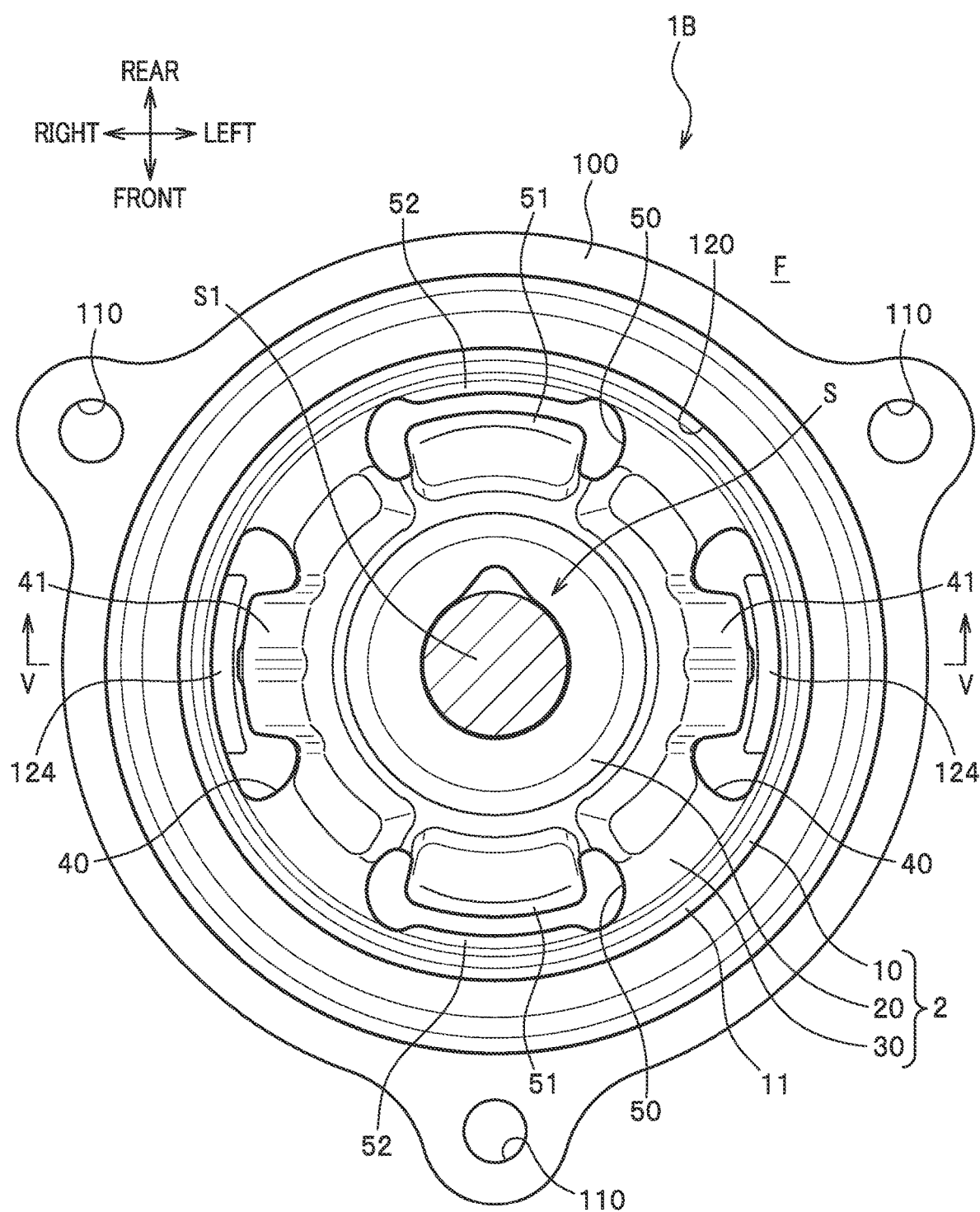
FIG. 4 is a plan view of a vibration-damping device according to a second embodiment of the present disclosure.

As shown in FIG. 4, the vibration-damping device 1B of the second embodiment has a configuration similar to that of the vibration-damping device 1A of the first embodiment (see FIG. 1), except a first receiving parts 124.

Figure 5:
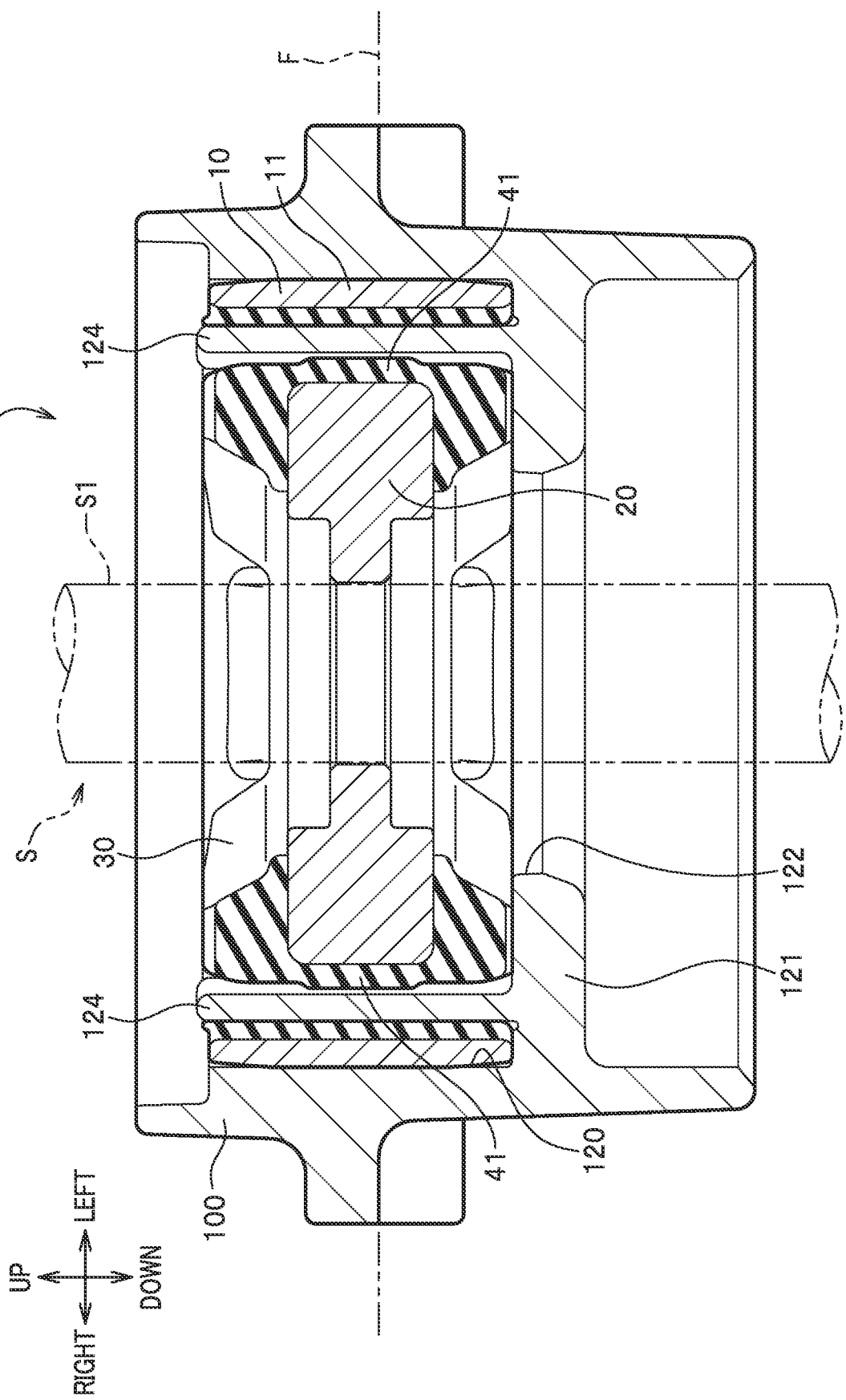
FIG. 5 is a cross-sectional view, taken along a line V-V in FIG. 2, of the vibration-damping device according to the second embodiment of the present disclosure.

As shown in FIG. 5, in the vibration-damping device 1B of the second embodiment, the first receiving parts 124 protrude upward from the bottom 121 in the mounting hole 120. The first receiving parts 124 of the second embodiment are formed in a plate shape to have the same height as the depth of the mounting hole 120.

The first bores 40 of the rubber elastic body 30 of the second embodiment are holes penetrating through the rubber elastic body 30 in the axial direction.

The first receiving parts 124, which protrude from the bottom 121 in the mounting hole 120 toward the rubber elastic body 3, are inserted into the first bores 40.

As shown in FIG. 4, the outermost surfaces of the first stoppers 41 of the rubber elastic body 30 face the innermost surfaces of the first receiving parts 124 in the mounting hole 120, across gaps in the radial direction of the mounting hole 120.

In the vibration-damping device 1B of the second embodiment as described above, only the first stoppers 41 of the first stoppers 41 and first receiving parts 124 are formed in the rubber elastic body 30. Accordingly, the vibration-damping member 2 can be molded using a mold such that the gaps between the first stoppers 41 and first receiving parts 124 are small. Therefore, with the vibration-damping device 1B of the second embodiment, vibration-damping characteristics can be precisely adjusted in accordance with the required vehicle characteristics while manufacturing costs are prevented from increasing.

Further, the vibration-damping device 1B of the second embodiment does not need to have an opening in the circumferential wall 11 of the outer cylinder 10, to reduce processing costs for the outer cylinder 10.

The second embodiment of the present disclosure has been described above. However, the present disclosure is not limited to the second embodiment described above, and can be appropriately modified without departing from the gist thereof, as with the first embodiment described above.

What is claimed is:

1. A damper mount which is inserted between a suspension of a vehicle and a vehicle body frame of the vehicle, the damper mount comprising:
   a housing having an inner circumferential wall defining a cylindrical mounting hole therein; and
   a vibration-damping member disposed in the mounting hole, wherein
   the vibration-damping member includes:
      an outer cylinder fitted in the mounting hole;
      an inner cylinder disposed in the outer cylinder; and
      a rubber elastic body inserted between the outer cylinder and the inner cylinder to elastically join the outer cylinder with the inner cylinder,
   the outer cylinder includes a circumferential wall defining a communication hole extending through the circumferential wall in a radial direction of the mounting hole,
   the rubber elastic body includes:
      an outer circumferential wall disposed on the circumferential wall of the outer cylinder;
      a recess recessed from the outer circumferential wall, the recess extending in an axial direction of the damper mount and communicating with the communication hole; and
      at least one stopper protruding from a radially-inner wall surface of the recess,
   the housing includes on the inner circumferential wall a receiving part which faces the at least one stopper in the radial direction of the mounting hole, across a gap and through the communication hole, and
   the rubber elastic body is configured to be displaced such that the at least one stopper comes in contact with the receiving part through the communication hole.

2. The damper mount as claimed in claim 1, wherein
   the receiving part protrudes from the inner circumferential wall of the housing so as to be inserted into the communication hole.

3. The damper mount as claimed in claim 1, wherein
   the communication hole is formed from one edge to an other edge in an axial direction of the circumferential wall of the outer cylinder.

4. The damper mount as claimed in claim 1, wherein
   the at least one stopper comprises a plurality of stoppers,
   the rubber elastic body is formed with the plurality of the stoppers, and
   the housing is formed with the receiving part facing at least one of the plurality of stoppers.

\* \* \* \* \*